INVENTOR.
Henrique A. F. Rocha.

2,870,380
POWER SUPPLY SYSTEMS

Henrique A. F. Rocha, Schenectady, N. Y., assignor to General Electric Company, a corporation of New York Application October 22, 1956, Serial No. 617,612

10 Claims. (Cl. 317—17)

The present invention relates to power supply systems, and more particularly to a transformerless power supply system for electronic apparatus, such as a radio-wave communication set, an industrial electronic instrument, or the like.

It is a general object of the invention to provide a power supply system that comprises apparatus that is connectible in either direction to an associated A.-C. supply having a grounded or near ground conductor and an ungrounded conductor, and incorporating a relay arrangement that is selectively controlled in accordance with the direction of connection of the apparatus to the A.-C. supply for selectively further connecting the A.-C. supply to associated rectifier equipment, also incorporated in the apparatus, so that a fixed predetermined polarity of the rectifier equipment is maintained regardless of the direction of connection of the apparatus to the A.-C. supply.

Another object of the invention is to provide a power supply system of the character described, wherein the apparatus also incorporates a chassis that is positively connected to ground potential and to a predetermined one of the terminals of the rectifier equipment, whereby shock hazard in the apparatus is eliminated, since the polarity of the rectifier equipment is fixed and the chassis is at ground potential, regardless of the direction of connection of the apparatus to the A.-C. supply.

A further object of the invention is to provide a power supply system of the character described, wherein the relay arrangement is ineffective to complete the further connection of the A.-C. supply to the rectifier equipment in the event of failure of the ground connection to the chassis.

Further features of the invention pertain to the particular arrangement of the elements of the power supply system, whereby the above-outlined and additional operating features thereof are attained.

The invention, both as to its organization and method of operation, together with further objects and advantages thereof will best be understood by reference to the following specification taken in connection with the accompanying drawing, in which:

Figure 1 is a schematic diagram of a conventional power supply system for a radio-wave communication set, or the like;

Figure 1:
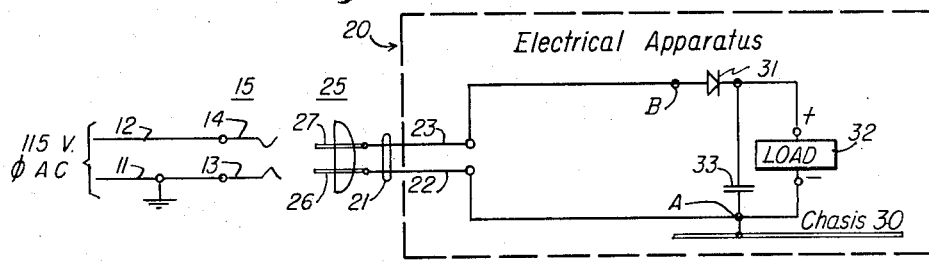

Referring now to Fig. 1 of the drawing, there is illustrated a conventional arrangement of an A.-C. power supply of 115-volts, single-phase, provided with a grounded conductor 11 and an ungrounded conductor 12 respectively connected to the two contact elements 13 and 14 of an associated socket 15, as well as electrical apparatus 20, that may take the form of a radio-wave communication set, such, for example, as a home-radio receiver set, a home television-receiver set, an industrial electronic instrument, or the like.

More particularly, the apparatus 20 is normally portable and provided with a flexible power cable 21 including a pair of leads 22 and 23 arranged in insulated relation with respect to each other and enclosed in an insulating jacket, not shown, and terminated by a plug 25 that is provided with two contact elements 26 and 27. The plug 25 may be inserted, in either direction, into the socket 15 in a conventional manner; whereby the contact elements 13 and 14 of the socket 15 may be respectively connected to the contact elements 26 and 27 of the plug 25, or alternatively the contact elements 13 and 14 of the socket 15 may be respectively connected to the contact elements 27 and 26 of the plug 25.

Also the apparatus 20 comprises a chassis, indicated at 30, a pair of terminals, indicated at A and B, a rectifier 31, a load 32 and a capacitor 33. In the arrangement, the rectifier 31 and the load 32 are connected in series relation in the order named between the terminals B and A, and the capacitor 33 is bridged across the load 32. Further, the leads 22 and 23 of the power cable 21 are respectively connected to the terminals A and B; while the chassis 30 is also connected to the terminal A. Of course, it will be understood that the load 32 in fact comprises the electronic elements (not shown in detail) in the apparatus 20.

Thus the power supply system for the apparatus 20 is of the "transformerless type," and in the operation thereof, the operating potential of the chassis 30 with respect to ground potential depends entirely upon the direction in which the plug 25 is inserted into the socket 15, which, of course, depends entirely upon accident or probability. Specifically, the chassis 30 is at "minus ground" potential when the elements 26 and 27 of the plug 25 respectively engage the elements 13 and 14 of the socket 15; whereas the chassis 30 is at "minus high" potential when the elements 26 and 27 of the plug 25 respectively engage the elements 14 and 13 of the socket 15. Of course, it follows that when the chassis 30 is at "minus ground" potential, the operation of the apparatus 20 is entirely safe; whereas when the chassis 30 is at "minus high" potential, the operation of the apparatus 20 is hazardous to the user in the event he should simultaneously contact the chassis 30 and ground potential. Thus there is a probability of 50% hazardous operation of the apparatus 20; in which case the voltage difference between the "minus high" potential of the chassis 30 and ground potential is entirely adequate to effect electrocution of a person making simultaneous contact with the chassis 30 and any object at ground potential.

Figure 2:
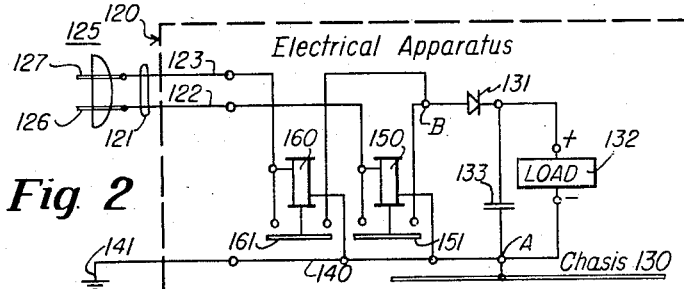
Fig. 2 is a schematic diagram of a power supply system for apparatus of the character noted and embodying the present invention.

Referring now to Fig. 2, the electrical apparatus 120 there illustrated comprises a power supply system embodying the features of the present invention and including the elements 121, 125, 130, 131, 132, 133, A and B, respectively corresponding to the elements 21, 25, etc., in Fig. 1.

Also the power supply system incorporated in the apparatus 120 comprises a ground conductor 140 that is connected to ground potential exteriorly thereof, as indicated at 141; which ground conductor 140 is also connected commonly to the terminal A and to the chassis 130. Further, the power supply system comprises a first relay 150 provided with a winding connected between the first lead 122 in the power cable 121 and the ground conductor 140, and a second relay 160 provided with a winding connected between the second lead 123 in the power cable 121 and the ground conductor 140. The relay 150 also includes a contact bridging member 151 controlling an associated pair of front contacts that are respectively connected to the first lead 122 and to the terminal B; while the relay 160 also includes a contact bridging member 161 controlling an associated pair of front contacts that are respectively connected to the second lead 123 and to the terminal B.

In the operation of the apparatus 120, the plug 125 may be inserted in either direction into the associated socket 15, as previously explained. In the event the plug 125 is inserted so that the elements 126 and 127 are respectively connected to the grounded conductor 13 and to the ungrounded conductor 14, the winding of the relay 150 is short-circuited and the winding of the relay 160 is energized. Accordingly, only the relay 160 operates connecting at its contact bridging member 161 the ungrounded lead 123 to the terminal B, thereby rendering operative the rectifier 131 to supply the load 132 and to effect charging of the capacitor 133, all in an obvious manner. On the other hand, in the event the plug 125 is inserted so that the elements 127 and 126 are respectively connected to the grounded conductor 13 and to the ungrounded conductor 14, the winding of the relay 160 is short-circuited and the winding of the relay 150 is energized. Accordingly, only the relay 150 operates connecting at its contact bridging member 151 the ungrounded lead 122 to the terminal B, thereby rendering operative the rectifier 131. Accordingly, it will be understood that regardless of the direction of the insertion of the plug 125 into the socket 15, the ungrounded conductor of the A.-C. supply is always connected to the terminal B; whereby the polarity of the rectifier 131 and the series connected load 132 remain fixed and the chassis 130 remains at ground potential. Hence, in the apparatus 120, there is no unsafe or hazardous operating condition thereof.

In the apparatus 120, in the event of failure of the ground connection 141, insertion of the plug 125 in either direction into the associated socket 15 brings about the energization of the windings of the relays 150 and 160 in series relation with each other; however, neither of the relays 150 or 160 is operated, since each of the relays is so constructed and arranged that the pick-up voltage thereof is somewhat greater than ½ of the full line to line voltage of the A.-C. supply. Thus neither of the relays 150 or 160 is operated, whereby both of the leads 121 and 123 are disconnected from the terminal B so that no potential is applied to the rectifier 131 and so that there is no potential applied to the chassis 130. Thus in the event of failure of the ground connection 140, there is a corresponding failure of the power supply system incorporated in the apparatus 120.

Figure 3:
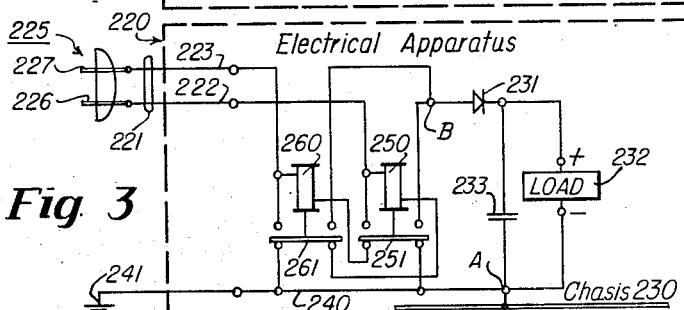
Fig. 3 is a schematic diagram of a modified form of the power supply system also embodying the present invention.

Referring now to Fig. 3, the electrical apparatus 220 there illustrated comprises a power supply system embodying the features of the present invention and including the elements 221, 225, 230, 231, 232, 233, 240, 250, 260, A and B respectively corresponding to the elements 121, 125, etc., in Fig. 2. Also in this arrangement, the contact bridging member 251 of the relay 250 is provided with a pair of back contacts, as well as the pair of front contacts; which pair of back contacts is serially included in the circuit for energizing the winding of the relay 260 between the lead 223 and the ground conductor 240. Similarly, the contact bridging member 261 of the relay 260 is provided with a pair of back contacts, as well as the pair of front contacts; which pair of back contacts as well as the pair of front contacts; which pair of back is serially included in the circuit for energizing the winding of the relay 250 between the lead 222 and with ground conductor 240.

The operation of the power supply system incorporated in the apparatus 220 is substantially identical to that of the power supply system incorporated in the apparatus 120 except that the operation of the relay 250 is effective positively to interrupt the operating circuit for the relay 260; while the operation of the relay 260 is effective positively to interrupt the operating circuit for the relay 250.

Figure 4:
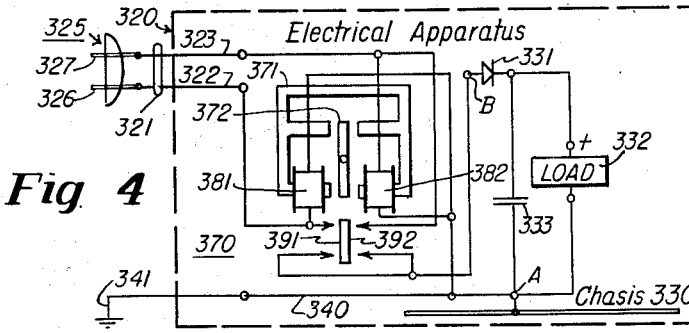
Fig. 4 is a schematic diagram of another modified form of the power supply system also embodying the present invention.

Referring now to Fig. 4, the electrical apparatus 320 there illustrated comprises a power supply system embodying the features of the present invention and including the elements 321, 325, 330, 331, 332, 333, A and B, respectively corresponding to the elements 121, 125, etc., in Fig. 2. Also in this arrangement, the unitary relay 370 is provided that includes a magnetic field element 371 and a cooperating magnetic armature 372, the armature 372 being mounted for pivotal movement intermediate the ends thereof. Also the field member 371 is provided with two pairs of pole projections cooperating with the armature 372, corresponding ones of the pole projections of the two pairs carrying the field windings 381 and 382. In the arrangement, the field winding 381 is connected between the lead 322 and the ground conductor 340, while the field winding 382 is connected between the lead 323 and the ground conductor 340. Further, the armature 372 carries two contact bridging members 391 and 392 that respectively control associated pairs of contacts. More particularly, the contact bridging member 391 controls a pair of contacts that are respectively connected to the lead 322 and to the terminal B; while the contact bridging member 392 controls a pair of contacts that are respectively connected to the lead 323 and to the terminal B. The relay 370 is of the null-seeking type, in order to prevent faulty operation thereof at the time that the plug 325 is inserted into the socket 15.

In the operation of the apparatus 320, when the plug 325 is inserted into the socket 15 so that the ungrounded conductor 14 of the power supply is connected to the lead 323, the field winding 382 is energized effecting the rotation of the armature 372 in the counterclockwise direction so that the contact bridging member 392 connects the lead 323 to the terminal B in order to bring about operation of the rectifier 331 in the manner previously explained. On the other hand, when the plug 325 is inserted into the socket 15 so that the ungrounded conductor 14 of the power supply is connected to the lead 322, the field winding 381 is energized effecting rotation of the armature 372 in the clockwise direction so that the contact bridging member 391 connects the lead 322 to the terminal B in order to bring about operation of the rectifier 331 in the manner previously explained.

Also in conjunction with the operation of the apparatus 320, it is mentioned that in the event of failure of the ground connection 341 to the ground conductor 340, the two field windings 381 and 382 are energized in series relation, when the plug 325 is inserted in either direction in the socket 15, whereby the armature 372 remains in its normal or rest position so that no potential is connected to the terminal B in order to prevent operation of the rectifier 331; whereby no potential is applied to the chassis 330.

In view of the foregoing, it will be understood that in each of the apparatus 120, 220 and 320, the relay arrangement is responsive to the direction in which the associated plug is inserted into the associated socket terminating the A.-C. supply so that the lead to which the ungrounded conductor of the A.-C. source is connected is always further connected to the same predetermined terminal of the rectifier incorporated in the apparatus; whereby the polarity of the rectifier and the series connected load is always maintained in a given relation; and whereby the chassis of the apparatus that is connected to the other terminal of the load, and also to ground potential, is always maintained at ground potential so as to prevent shock hazard in the apparatus.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In combination, an A.-C. supply provided with two conductors that are respectively grounded and ungrounded, two leads, means for completing random selective connections between said two conductors and said two leads, said ungrounded conductor being connected to either one of said leads at random, electrical apparatus adapted to be operated with only one polarity and provided with two terminals, a connection between one of said terminals and ground potential, and relay means responsive to the connection of said ungrounded conductor to either one of said leads for further connecting said one lead to the other of said terminals.

2. The combination set forth in claim 1, wherein said electrical apparatus further comprises a chassis also connected to said one terminal.

3. The combination set forth in claim 1, wherein said electrical apparatus essentially comprises a rectifier and a load connected in series relation between said two terminals.

4. In combination, two terminals, a rectifier and a load connected in series relation between said two terminals, a ground connection to one of said terminals, two leads, a plug terminating said leads and adapted to be connected in either direction to a cooperating socket terminating the two conductors of an A.-C. supply that are respectively grounded and ungrounded, the ungrounded conductor being connected at random to either one of said leads, and relay means responsive to the connection of the ungrounded conductor to either one of said leads for further connecting said one lead to the other of said terminals.

5. In combination, two terminals, a rectifier and a load connected in series relation between said two terminals, a ground connection to one of said terminals, first and second leads, a first relay provided with a first winding connected between said first lead and said one terminal and operative to connect said first lead to the other of said terminals, a second relay provided with a second winding connected between said second lead and said one terminal and operative to connect said second lead to said other terminal, and a plug terminating said first and second leads and adapted to be connected in either direction to a cooperating socket terminating the two conductors of an A.-C. supply that are respectively grounded and ungrounded, whereby the ungrounded conductor may be connected to either one of said leads to effect operation of the corresponding one of said relays.

6. The combination set forth in claim 5, wherein the pick-up voltage of each of said relays is in excess of one-half that of the A.-C. supply, whereby neither of said relays can be operated in response to respective connections of the two conductors in either direction to said two leads in the event of interruption of said ground connection to said one terminal.

7. The combination set forth in claim 5, wherein said first relay is also operative to interrupt said connection including said second winding, and said second relay is also operative to interrupt said connection including said first winding.

8. In combination, two terminals, a rectifier and a load connected in series relation between said two terminals, a ground connection to one of said terminals, first and second leads, a magnetic structure provided with first and second windings and an armature, said first winding being connected between said first lead and said one terminal, said second winding being connected between said second lead and said one terminal, said armature being operative in first and second modes in response to respective energization of said first and second windings, first contacts closed in response to said first mode of operation of said armature and connecting said first lead to the other of said terminals, second contacts closed in response to said second mode of operation of said armature and connecting said second lead to said other terminal, and a plug terminating said first and second leads and adapted to be connected in either direction to a cooperating socket terminating the two conductors of an A.-C. supply that are respectively grounded and ungrounded, whereby the ungrounded conductor may be connected to either one of said leads to effect energization of the corresponding one of said windings.

9. In electrical apparatus, a chassis, two terminals, a rectifier and a load connected in series relation between said two terminals, a ground connection common to said chassis and to one of said terminals, two leads, a plug terminating said leads and adapted to be connected in either direction to a cooperating socket terminating the two conductors of an A.-C. supply that are respectively grounded and ungrounded, whereby the ungrounded conductor may be connected to either one of said leads, and relay means responsive to the connection of the ungrounded conductor to either one of said leads for further connecting said one lead to the other of said terminals, whereby the polarity of said load and the grounding of said chassis are in no way affected by the direction of the connection of said plug to the cooperating socket.

10. The electrical apparatus set forth in claim 9, wherein said load essentially comprises the electronic elements of a radio-wave communication set.

References Cited in the file of this patent

UNITED STATES PATENTS

| | | |
|---|---|---|
| 2,689,939 | Godshalk | Sept. 21, 1954 |
| 2,791,728 | Traugott | May 7, 1957 |

FOREIGN PATENTS

| | | |
|---|---|---|
| 713,337 | Germany | Nov. 6, 1941 |